June 29, 1926.
E. L. VONDERSAAR
1,590,459
DOWEL LOCATOR FOR FURNITURE REPAIRS
Filed Nov. 19, 1925  2 Sheets-Sheet 2
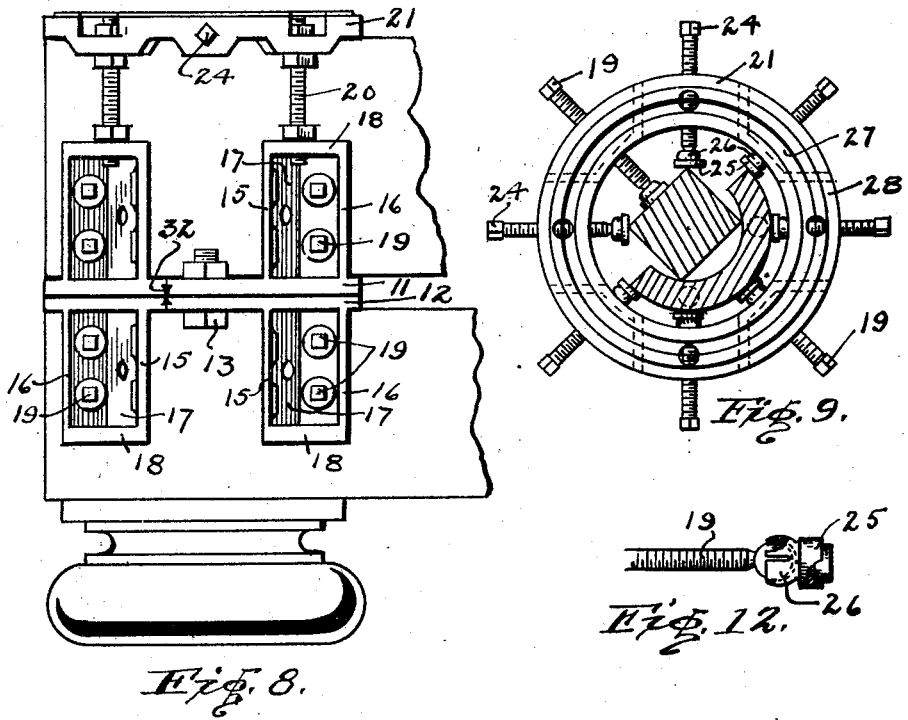
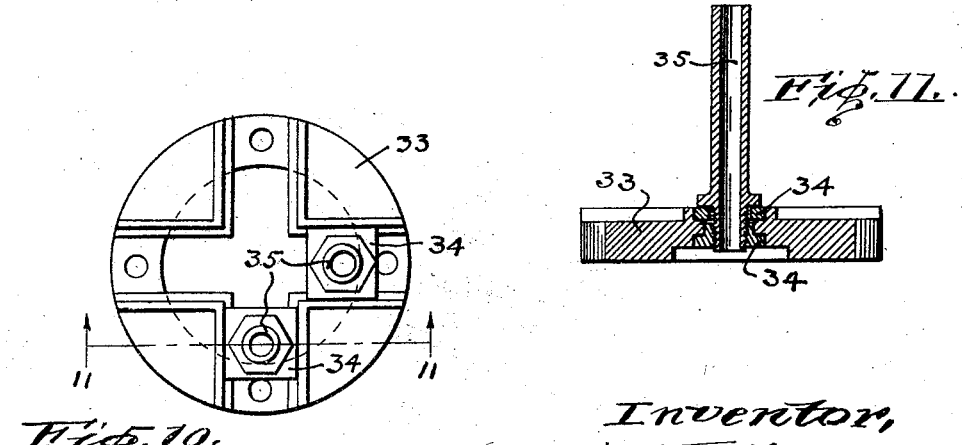
Inventor,
Edwin L. Vondersaar,
By Minturn & Minturn
Attorneys.

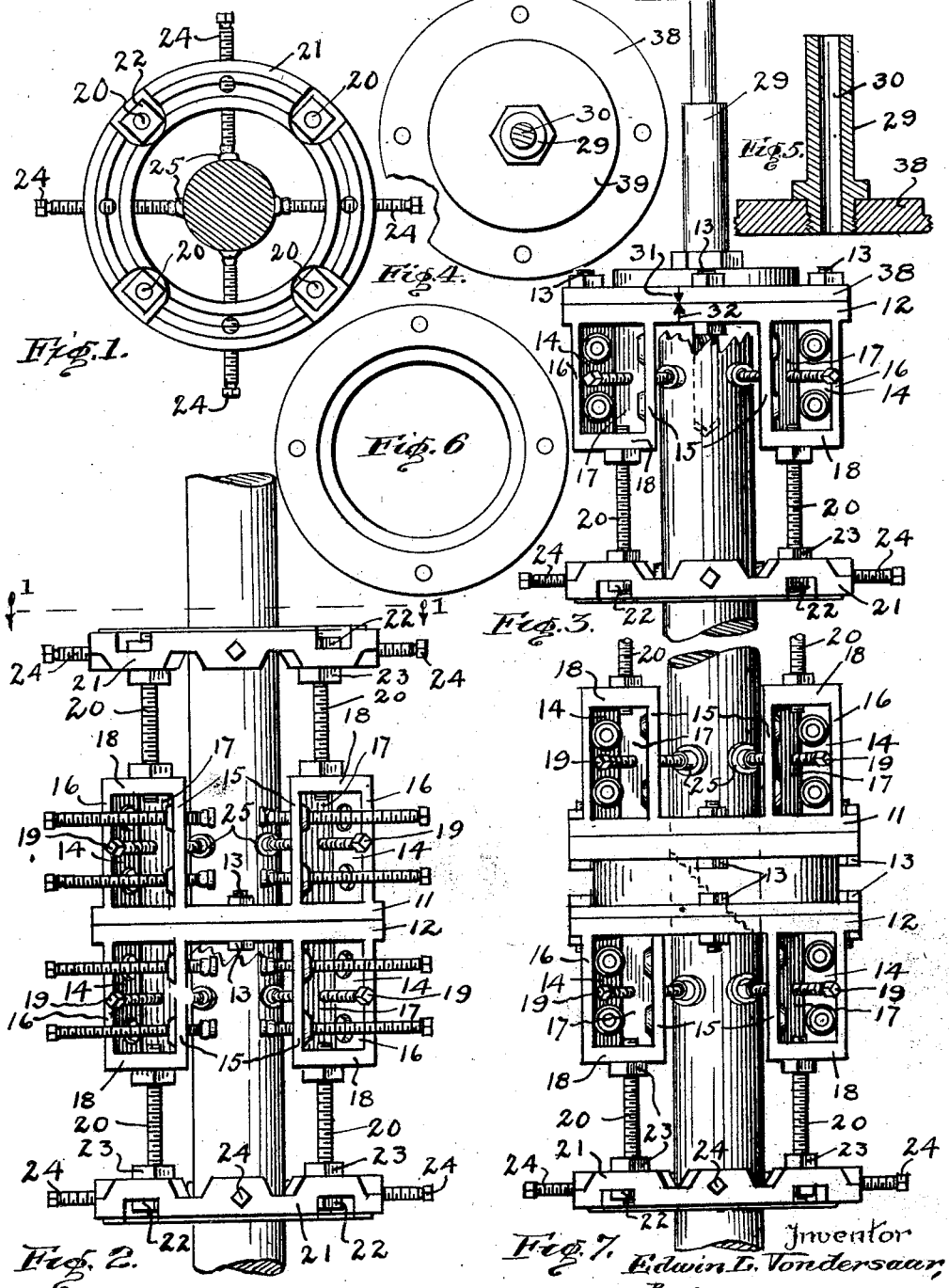

Patented June 29, 1926.

1,590,459

UNITED STATES PATENT OFFICE.

EDWIN L. VONDERSAAR, OF INDIANAPOLIS, INDIANA.

DOWEL LOCATOR FOR FURNITURE REPAIRS.

Application filed November 19, 1925. Serial No. 70,194.

This invention relates to means for repairing broken furniture by reenforcing the fracture with dowel pins extending for an equal distance into the two dismembered parts. This requires that the holes for the pins in the two parts be in perfect alinement with each other when the parts are reassembled in the positions which they occupied before the break occurred. This, heretofore, has been accomplished with difficulty and much uncertainty, and it is the object of this invention to provide means for boring such dowel holes readily and with entire accuracy.

Other incidental objects will hereinafter appear and the novel mechanism thereof included in the appended claims.

I accomplish the objects of the invention by the means illustrated in the accompanying drawings, in which—

Fig. 1, is a transverse section on the line 1—1 of Fig. 2. Fig. 2, is an elevation of my duplex separable clamp applied to a broken post which is assembled therein in the positions of the post-parts before any break occurred. Fig. 3, shows one member of the duplex clamp detached from the other clamp member but still holding its member of the broken column, and also showing a drill-guide applied to said clamp member and a drill operatively held by the guide.

Fig. 4 is a plan view of the drill-guide, and Fig. 5 is a vertical section of the central portion of the drill guide. Fig. 6 is a plan view of the extension sleeve, detached, and Fig. 7 is a side elevation of my duplex separable clamp with an extension sleeve between the two clamp members, which is desirable where a long oblique break occurs in the furniture to be mended. Fig. 8 is a view in side elevation showing my invention applied, as to the lower frame of a lounge or sofa to which the lower clamp member is clamped by horizontal bolts, the lower outer ring being removed to avoid a turned foot, and in which the outer ring of the upper clamp member forces the upper and lower frame members together, Fig. 9 shows another application of my invention, as for repairing hollow half-columns, requiring the joint use of all of the horizontal clamp-screws.

Figs. 10 and 11 are details of the adjustable drill-guide Fig. 11, being a vertical section on the line 11—11 in Fig. 10. Fig. 12 illustrates the removable bearing end for the set screws of the clamp.

Like characters of reference indicate like parts in the several views of the drawings.

The essential features of my invention are a pair of rings 11 and 12, which are adapted to be detachably held in contact with each other by suitable means, here shown as by bolts 13, in a meeting plane between them which is at right angles to the axis of any proposed dowel-pin. Each ring 11 or 12, is provided with a clamp-extension by which it is attached to a broken furniture member, such, that the clamp-extension for each ring will be attached to the furniture member on opposite sides of the breaks. The clamps will only be applied when the two broken members are in perfect fit and alinement, and, therefore, when the rings are unbolted and the furniture members separated the planes of the rings will be at right angles to the required dowel holes. It follows, that a drill-guide, attached to a plate contacting one of the rings, and of which the contacting face of the plate is at right angles to the bore of the drill-guide will so direct the drill that dowel-holes at right angles to the rings will be made in both furniture members, and if the same drill-guide is used in the same relative position on the rings of the two furniture members the dowel holes will register in perfect alinement.

Any suitable clamps on the rings may be used to position and hold the rings on the furniture members. These must obviously differ somewhat to suit the shapes of the members to be clamped, and the form illustrated in the accompanying drawings are as near universal in their adaptability as I have been able to devise.

They comprise four equally spaced apart extensions 14, cast integrally with each ring. Each extension 14 comprises a pair of plates 15 and 16, which are connected at their inner edges by a plate 17 and the outer ends of these plates are connected by a plate 18. The plate 17 as shown in Fig. 7 has a middle screw threaded hole for the passage of a radial set screw 19, but a plurality of such holes and set screws 19 are commonly used, and the plates 15 and 16 each have two screw threaded holes for the passage of similar set screws.

Each of the end plates 18 has a threaded hole receiving a threaded bolt 20, and the outer ends of the bolts of each ring screw into an outer ring 21. The bolts 20 have integral heads 22, faced to engage a wrench for rotating the bolts. Lock nuts 23 may be screwed on the bolts.

Each of the rings 21 has four equidistant radial threaded holes for the passage of set screws 24.

All of the set screws 19 and 24 preferably have swivelly attached bearing members 25 faced with rubber or other yielding material to avoid abrasion of the furniture surfaces contacted by them. The screws, preferably will terminate with balls over which split, sockets 26 on the bearing members will be sprung, and which may be removed by a reverse operation when it is desired to remove its set screw.

The meeting faces of the rings 11 and 12 and 21 will each preferably have corresponding grooves 27 and channels 26 to interlock them against lateral displacement. All of said grooved and channeled faces will interchangeably interlock.

Some of the various applications of the above described clamps are illustrated in the drawing. Figure 2 shows the application to a broken solid cylindrical column in which only the radial set screws are used. Figure 8 shows the lower clamp fastened to the horizontal frame of a lounge by means of the screws through the plates 15, the lower ring 21 and its bolt connections being removed because they interfere with the turned foot of the lounge. The upper ring 21 is used as a clamp against the top furniture member to force the two furniture members toward each other, and the screws through plates 15 of the upper clamp member alone are utilized. The two furniture members are here spaced apart by the rings 11 and 12.

For the repairs of the character shown in Figs. 1 and 8, after the clamps 14 are tightened and the rings 11 and 12 are unbolted and separated, a drill-guide is used comprising a plate 38 having a centering flange 39, and screwed into the middle of the plate is a post 29 through which is a longitudinal drill-guide hole 30. The inserted end of the post is screw-threaded and a nut formation on the post receives a wrench for screwing it into or out of position. A positioning mark 31 on the edge of the plate enables the operator to place the drill guide in relative position on the two clamp rings by registering mark 31 with a corresponding mark 32 on the rings. When placed the drill-guide plate is bolted to its clamp ring while the hole is being drilled.

Fig. 9 shows the clamp applied to a half-cylindrical column, that requires all of the set screws to be used, and two dowel holes are to be drilled. A modified form of drill guide is therefore used in making the dowel holes as shown in Figs. 10 and 11. The plate 33 has two diametrical T-slots at right angles to each other, in each of which is an adjustable guide post 35. A slide-block 34 on the lower end of the post 35 is in two parts which are drawn together by the threaded end of the post, thereby clamping the post at any given position of its slot in the plate.

While I have here shown and described the best embodiment of my invention now known to me, it is obvious that it is capable of many variations, some of which I have described, and I therefore do not desire to be held to the precise forms shown, nor to any stricter interpretation of my invention than is required by the appended claims.

I claim:

1. A device for the purposes specified comprising a two-part separable member the parts of which are initially united, a clamp for each member adapted to rigidly attach it to one of a pair of broken-apart furniture members while the latter are in their original relative positions, and means cooperating with each of said members when separated for drilling dowel holes in the furniture members that will aline with each other when the furniture members are in their original relation to each other.

2. A device for the purposes specified comprising a pair of removably united rings, a clamp for each ring to attach it to one of a pair of broken-apart furniture members while the members are in their original relative positions, and a drill-guide cooperating with each ring after separation from each other for drilling dowel holes in the furniture members.

3. A locating device comprising a pair of removably united rings, a plurality of clamp members on each of said rings, a plurality of adjusting screws in each of said clamp members, and a drill-guide adapted to cooperate with each of said rings upon separation.

4. A locating device comprising a two-part separable member, a clamp for each member adapted to attach it rigidly to one of a pair of broken-apart furniture members while the latter are in their original relative positions, drill-guide means cooperating with each of said parts of the separable member when separated, and means cooperating with said separable member whereby said furniture members are pressed toward the line of their fracture.

5. A locating device comprising a pair of removably united rings, a clamp carried by each member adapted to attach that member rigidly to one of a pair of broken-apart furniture members while the latter are in their original relative positions, drill-guide means cooperating with each of said rings when separated one from the other, an outer ring carried by each of said removably united rings, furniture member clamp means carried by each of said outer rings, and adjustable means whereby the outer rings may be varied in position relative to the said removably united rings.

In testimony whereof I affix my signature.

EDWIN L. VONDERSAAR.